(12) United States Patent
Cheon (10) Patent No.: US 9,677,605 B2
(45) Date of Patent: Jun. 13, 2017

(54) HANGER BEARING ASSEMBLY (71) Applicant: Brian John Cheon, Avon Lake, OH (US)

(72) Inventor: Brian John Cheon, Avon Lake, OH (US)

(73) Assignee: BEARING TECHNOLOGIES, LTD., Avon, OH (US)

( * ) Notice: Subject to any disclaimer, the term of this patent is extended or adjusted under 35 U.S.C. 154(b) by 66 days.

(21) Appl. No.: 14/724,957

(22) Filed: May 29, 2015

(65) Prior Publication Data
US 2016/0348718 A1 Dec. 1, 2016

(51) Int. Cl.
| F16C 27/06 | (2006.01) |
| F16C 19/52 | (2006.01) |
| F16C 35/077 | (2006.01) |
| F16C 23/08 | (2006.01) |
| F16C 1/10 | (2006.01) |
| F16C 3/02 | (2006.01) |
| F16C 19/06 | (2006.01) |

(52) U.S. Cl.
CPC .......... F16C 19/527 (2013.01); F16C 23/084 (2013.01); F16C 27/066 (2013.01); F16C 35/077 (2013.01); F16C 1/108 (2013.01); F16C 3/023 (2013.01); F16C 19/06 (2013.01); F16C 2326/06 (2013.01)

(58) Field of Classification Search
CPC .................................................. F16C 27/066
See application file for complete search history.

(56) References Cited

U.S. PATENT DOCUMENTS

| 786,315 A | 4/1905 | Rogers |
| 870,945 A | 11/1907 | Floyd |
| 889,704 A | 6/1908 | Mair |
| 2,138,659 A | 11/1938 | Kindig |
| 2,397,164 A | 3/1946 | Shafer |
| 2,439,269 A | 4/1948 | Shafer |
| 2,687,926 A | 8/1954 | Gair et al. |
| 2,796,304 A | 6/1957 | Downs |
| 2,872,253 A * | 2/1959 | Foote ............... F16C 27/066 384/434 |
| 2,939,748 A | 6/1960 | Leach |
| 3,001,841 A | 9/1961 | Glavan et al. |
| 3,298,754 A | 1/1967 | Riester |
| 3,639,015 A | 2/1972 | Maas |
| 4,392,694 A | 7/1983 | Reynolds |
| 4,463,993 A | 8/1984 | Brissette et al. |
| 4,542,996 A | 9/1985 | Brissette et al. |
| 4,571,098 A | 2/1986 | Rudnik |
| 4,708,499 A | 11/1987 | Löser et al. |
| 4,722,618 A | 2/1988 | Matsumoto et al. |

(Continued)

FOREIGN PATENT DOCUMENTS

| EP | 1350971 | 10/2003 |
| FR | 2586276 | 2/1987 |

(Continued)

Primary Examiner — Thomas R. Hannon
(74) Attorney, Agent, or Firm — Thompson Hine LLP (57) ABSTRACT A bearing assembly including a mounting bracket configured to be coupled to a vehicle chassis, a vibration isolator coupled to the mounting bracket, and a bearing received in the vibration isolator. The bearing is configured to receive a drive shaft therein, and is pivotable relative to the vibration isolator.

19 Claims, 5 Drawing Sheets (56) References Cited

U.S. PATENT DOCUMENTS

| | | | |
|---|---|---|---|
| 5,052,825 A | 10/1991 | Bättig | |
| 5,161,903 A | 11/1992 | March | |
| 5,829,892 A | 11/1998 | Groves | |
| 5,868,503 A | 2/1999 | Bade | |
| 5,971,622 A | 10/1999 | Akazawa | |
| 6,132,099 A | 10/2000 | Olszewski et al. | |
| 6,379,048 B1 | 4/2002 | Brissette | |
| 6,422,947 B1 | 7/2002 | Kelly et al. | |
| 6,672,768 B2 * | 1/2004 | Borsch | B60K 17/24 267/140.2 |
| 7,097,363 B2 | 8/2006 | Ostrander et al. | |
| 7,534,048 B2 | 5/2009 | Holman | |
| 2003/0219183 A1 | 11/2003 | Schuetz | |

FOREIGN PATENT DOCUMENTS

| | | |
|---|---|---|
| JP | 2000079827 | 3/2000 |
| JP | 2003112533 | 4/2003 |
| WO | 2006/072012 | 7/2006 |

\* cited by examiner

HANGER BEARING ASSEMBLY

The present invention is directed to a hanger bearing assembly for use with a drive shaft, and more particularly, to a hanger bearing assembly which is automatically adjustable to accommodate variations in positioning of the drive shaft.

BACKGROUND

Traditional hanger bearing assemblies include a bearing which receives a drive shaft through the bearing to position and stabilize the drive shaft. In some cases the bearing assembly can include an isolator component surrounding the bearing to absorb vibration of the drive shaft. However, in many situations the drive shaft may not be properly aligned with the vehicle chassis. Existing rotatable hanger bearing assemblies do not sufficiently compensate for such misalignment of the drive shaft, while still providing sufficient vibration-isolation features. In particular in some cases the off-axis mounting position of the vibration-isolating component degrades performance. Furthermore, traditional rotatable hanger bearing assemblies do not permit rotation once fully mounted in place, subjecting the vibration-isolating component to additional stress as drive shaft operating angles may change during operation.

SUMMARY

In one embodiment, the present invention is a bearing assembly which is automatically adjustable/moveable to accommodate misalignment of the drive shaft, while still providing sufficient vibration isolation. More particularly, one embodiment of the invention is a bearing assembly including a mounting bracket configured to be coupled to a vehicle chassis, a vibration isolator coupled to the mounting bracket, and a bearing received in the vibration isolator. The bearing is configured to receive a drive shaft therein, and is pivotable relative to the vibration isolator.

DETAILED DESCRIPTION

Figure 1:
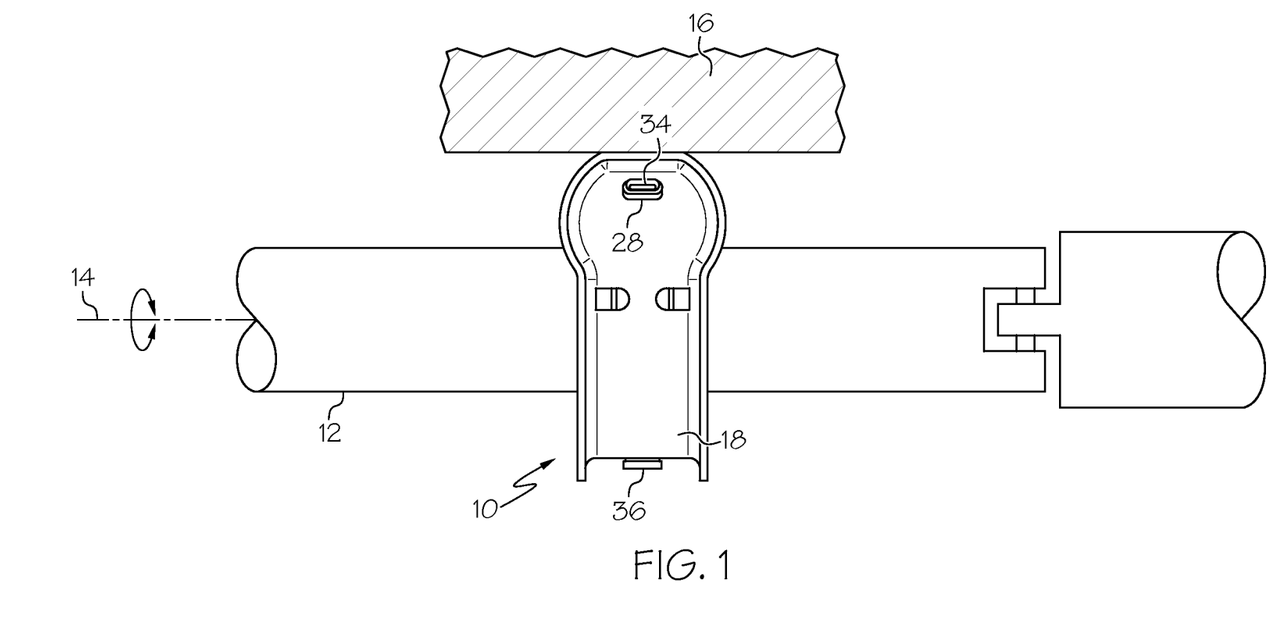
FIG. 1 is a side view of one embodiment of the hanger bearing assembly of the present invention, receiving a drive shaft therethrough.

With reference to FIG. 1, one embodiment of a hanger bearing assembly 10 is shown receiving a drive shaft or drive line 12 therethrough. Drive shafts 12 such as the one shown in FIG. 1 can be rotatable about their center axis 14, and are commonly used in automotive vehicles and other applications to transmit power via their rotation, such as from an engine to one or more driven wheels. It may be desired to secure the drive shaft 12 to the vehicle chassis/anchor component 16, or some other component, to position, stabilize and support the drive shaft 12, which can be accomplished by the hanger bearing assembly 10. While the hanger bearing assembly 10 is shown in FIG. 1 in conjunction with a drive shaft 12 of an automotive vehicle, it should be understood that the hanger bearing assembly 10 can be used in any of a variety of setting and applications where it is desired to support/align a rotatable shaft 12.

Figure 2:
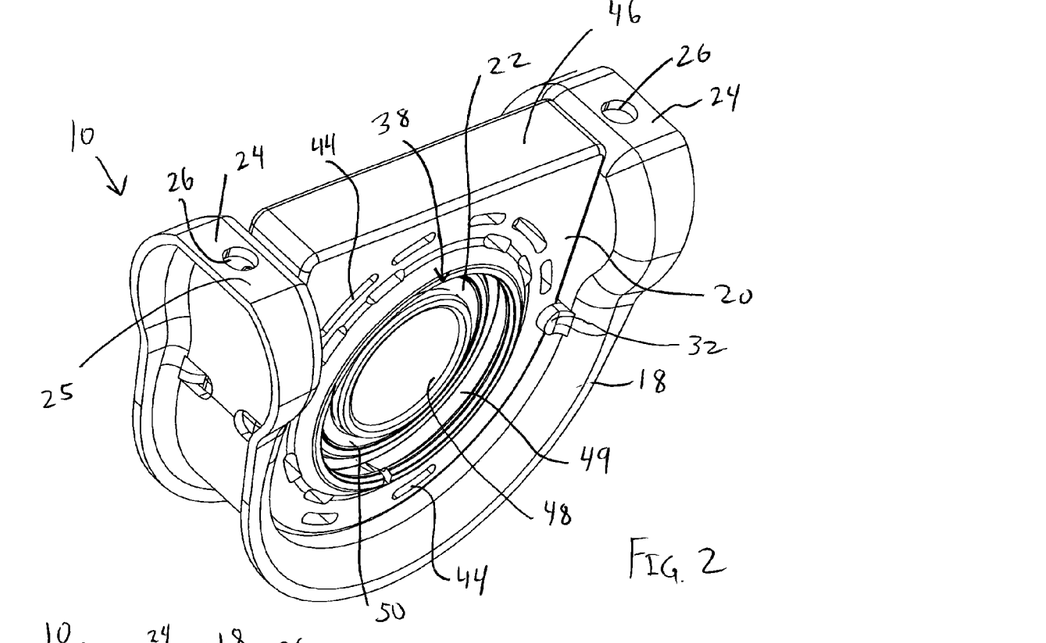
FIG. 2 is an upper perspective view of the hanger bearing assembly of FIG. 1.
Figure 3:
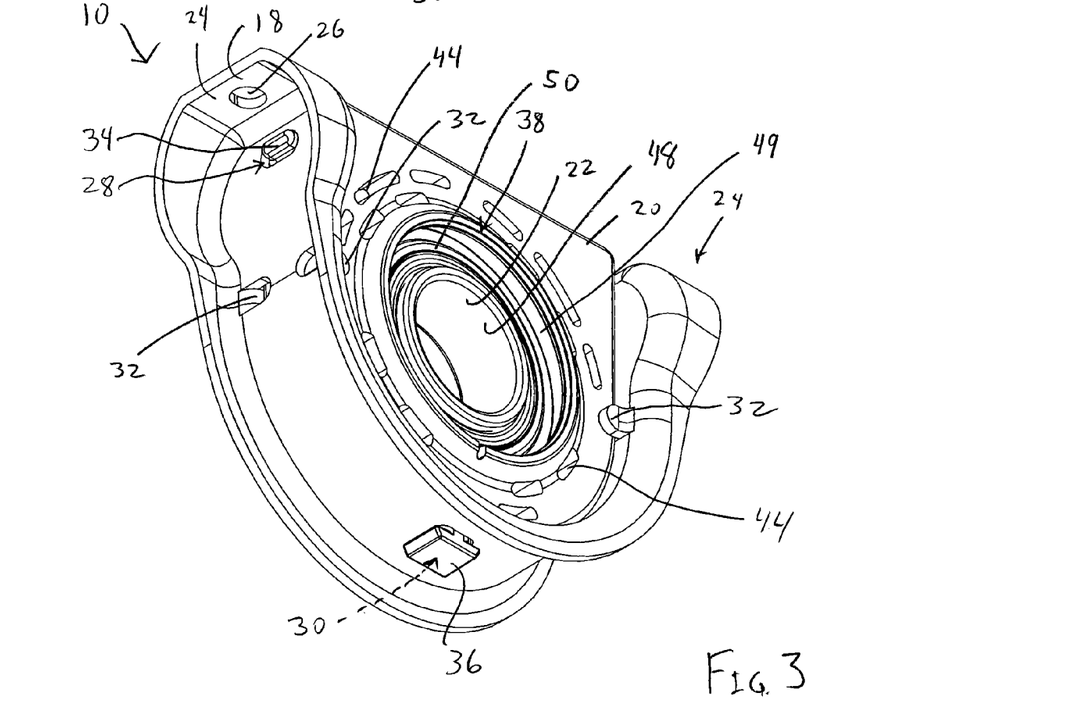
FIG. 3 is a lower perspective view of the hanger bearing assembly of FIG. 2.
Figure 7:
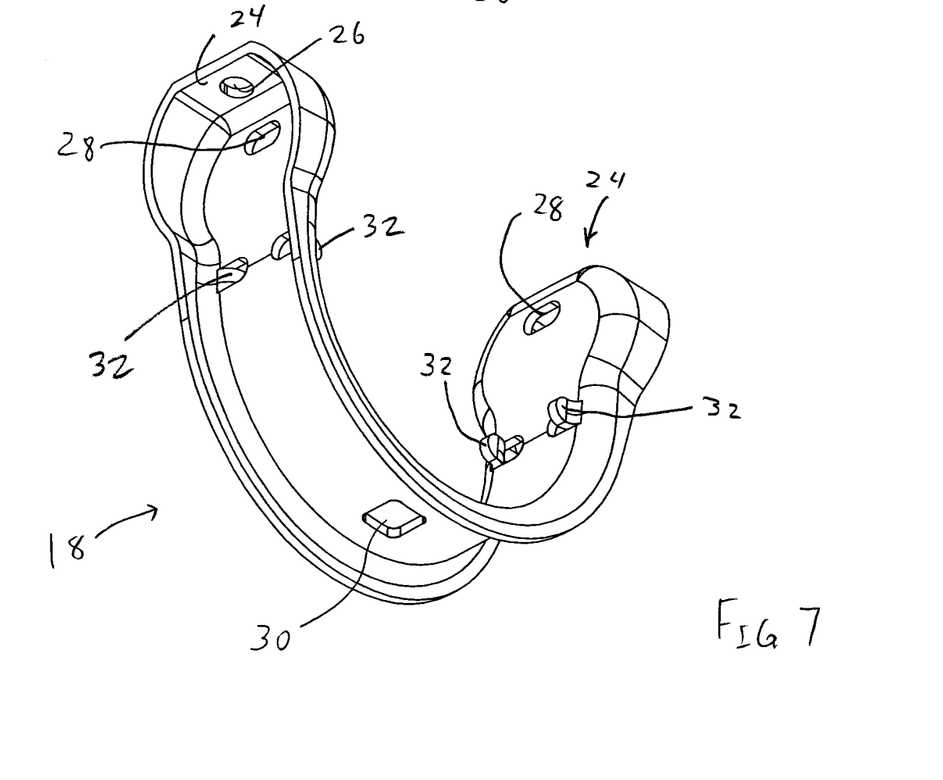
FIG. 7 is a perspective view of the mounting bracket of the hanger bearing assembly of FIG. 3.

With reference to FIGS. 2 and 3, the bearing assembly 10 includes, generally speaking, a mounting bracket 18, a cushion or vibration isolator 20 received within the mounting bracket 18, and a bearing 22 received in the vibration isolator. With reference to FIGS. 2 and 7, the mounting bracket 18 can be generally "U" shaped in front view, and include a pair of outwardly-extending flanges 24 at its upper end thereof. Each flange 24 can have an opening 26 therethrough and is configured to receive a fastener 23 therethrough (see FIG. 8) to secure the mounting bracket 18, and thereby the bearing assembly 10, to the underside of the chassis or anchor component 16. The upper extent 25 of the mounting bracket 18 is defined by the outwardly-extending flanges 24, thereby defining an upper surface 25 of the mounting bracket 18 configured to be attached to the vehicle chassis 16, as shown in FIGS. 1 and 8.

Figure 8:
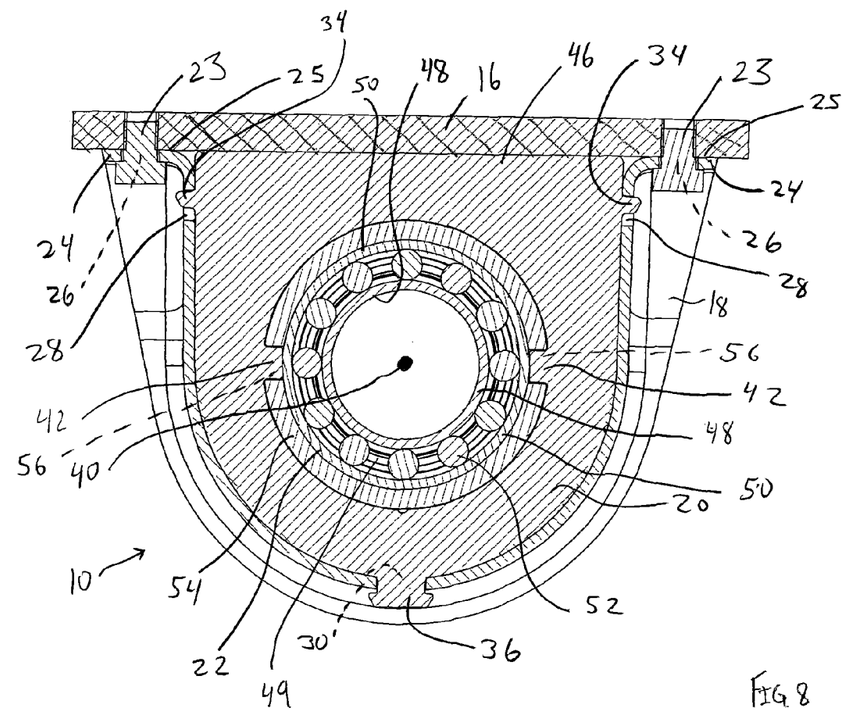
FIG. 8 is a front cross-section view of the hanger bearing assembly of FIG. 2, mounted to the underside of the vehicle chassis.

With reference to FIG. 8, the mounting bracket 18 can also include a pair of opposed side openings 28 and a central, bottom opening 30 formed therethrough. The mounting bracket 18 can also include two pairs of ears 32 (FIG. 7) extending inwardly and positioned on opposite sides of the mounting bracket 18. The mounting bracket 18 can be made of a variety of materials, but in one case is made of a relatively strong and durable material, including metal such as steel or the like, which can be stamped and bent into the desired shape.

Figure 6:
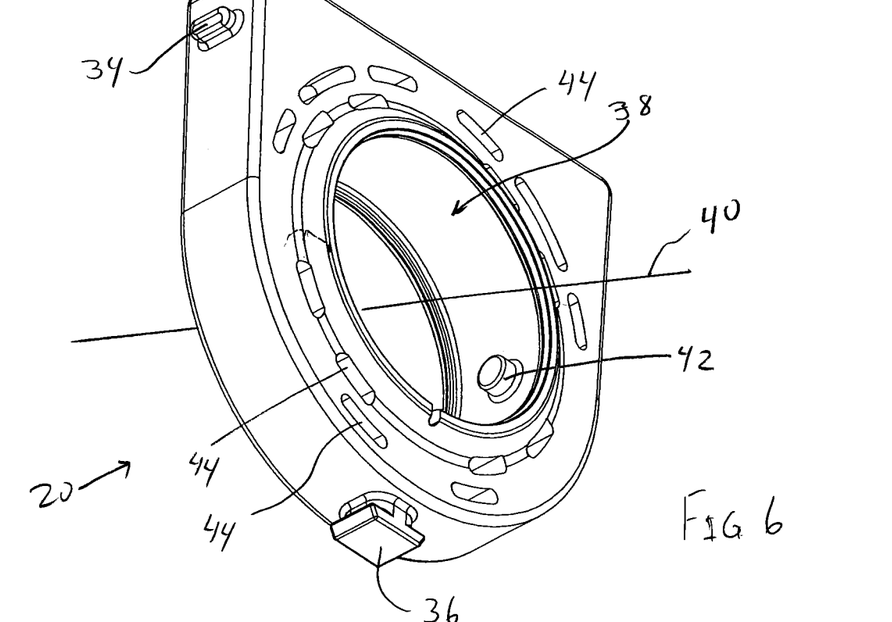
FIG. 6 is a perspective view of the vibration isolator of the hanger bearing assembly of FIG. 3.

With reference to FIG. 6, the vibration isolator 20 can also be generally "U" shaped in front view, and is shaped and sized to be closely received in the mounting bracket 18. The vibration isolator 20 can include a pair of outwardly-extending side protrusions 34 at opposite sides thereof, and a center bottom protrusion 36 at the bottom center of the vibration isolator.

The vibration isolator 20 can be made of materials and/or be configured to absorb and dissipate vibration from the drive shaft 12. The vibration isolator 20 can be made of an elastomeric material and/or a relatively soft material, such as natural rubber or synthetic rubber or combinations thereof. In one case, the vibration isolator 20 is made of material having a hardness of less than about 100 Shore A, and less than about 80 Shore A in another case, and greater than about 20 Shore A in one case.

Figure 4:
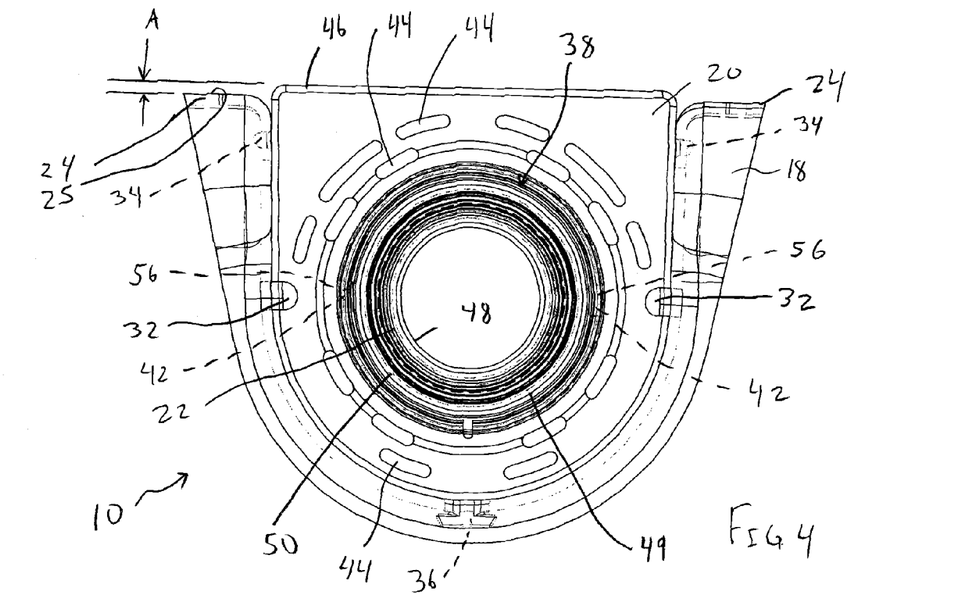
FIG. 4 is a front view of the hanger bearing assembly of FIG. 2.

The vibration isolator 20 can include a central opening 38 configured to receive the bearing 22 therein. The central opening 38 can define a central axis 40, and can be a spherical surface. In other words, the walls of the central opening 38 are curved with a spherical (more particularly, part or segment of a sphere) profile. As best shown in FIGS. 6 and 8, in one embodiment the vibration isolator 20 includes a pair of protrusions 42 extending radially inwardly into the central opening 38, positioned 180 degrees opposite each other. With reference to FIG. 4, it can be seen that in its un-compressed configuration, when the vibration isolator 20/bearing assembly 10 is not mounted to the vehicle chassis 16, the vibration isolator 20 includes an extension portion 46 extending beyond the upper surface 25 of the mounting bracket 18 by dimension A. In one case, the extension portion 46 comprises at least about 3% of a height of the vibration isolator 20 and/or mounting bracket 18 in the un-compressed position. The extension portion 46 can comprise less than about 5% of the height of the vibration isolator 20 and/or mounting bracket 18, and greater than about 1% of the height in another case.

The vibration isolator 20 can include a plurality of slots 44 formed at least partially through its thickness, in one case each slot 44 having a center of curvature concentric with the central opening 38. The slots 44 can be positioned at a variety of radial locations and shaped and configured to allow the vibration isolator 20 to absorb and/or dissipate vibration and provide a desired spring rate, but the slots 44 are optional and can be omitted if desired. In one case, the vibration isolator 20 has a minimum width (i.e. the smallest dimension extending in a radial line between the inner opening 38 and an outer surface of the vibration isolator 20) of about 15 mm in one case, or at least about 25 mm in another case, or have a minimum width at least as wide as the bearing 22 in the radial direction. In this manner, by ensuring that the vibration isolator 20 has a desired minimum width on all sides of the opening 38, the vibration forces can be sufficiently accommodated.

In order to secure the vibration isolator 20 to the mounting bracket 18, as best shown in FIG. 8, each side protrusion 34 of the vibration isolator 20 is received through a side opening 28 of the mounting bracket 18, and the center protrusion 36 of the vibration isolator 20 is received through the center opening 30 of the mounting bracket 18. The ears 32 of a given set of the mounting bracket 18 can have a distance therebetween generally corresponding to the thickness of the vibration isolator 20 such that the vibration isolator 20 is closely received between each set of ears 32 to further secure the vibration isolator 20 in place. It should be understood that the protrusions 34, 36 and openings 28, 30 can have a variety of shapes and configurations, and be positioned in different locations than those shown herein. In addition, the position of one more of protrusions 34, 36 and openings 28, 30 and can be reversed such that, for example, one or more protrusions 34, 36 are positioned on the mounting bracket 18, and one or more openings 28, 30 are positioned on the vibration isolator 20. In addition, various other different components or arrangements can be used to couple the vibration isolator 20 and mounting bracket 18.

Figure 5:
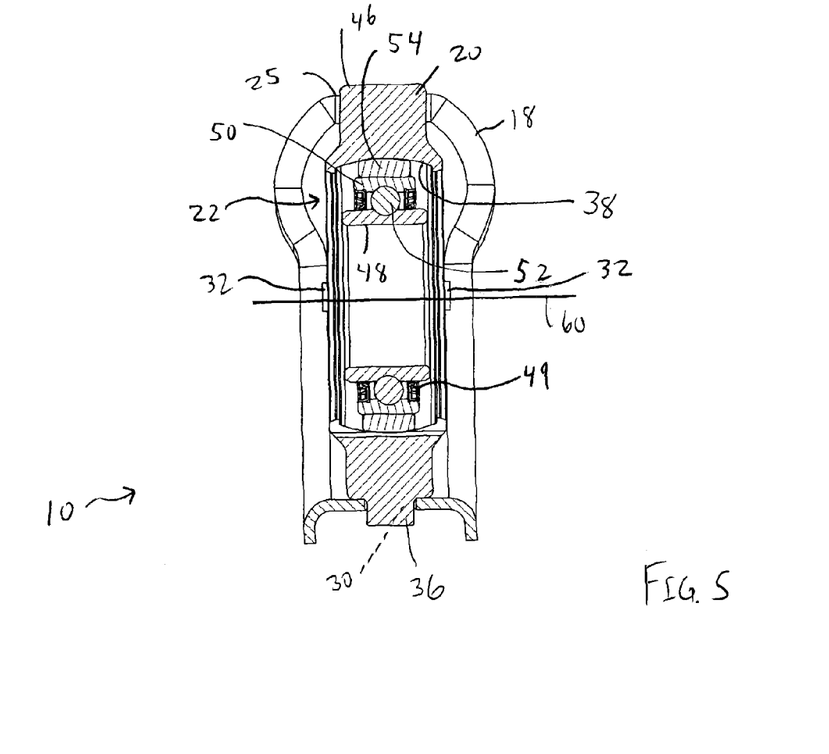
FIG. 5 is a side cross-section of the hanger bearing assembly of FIG. 2.
Figure 9:
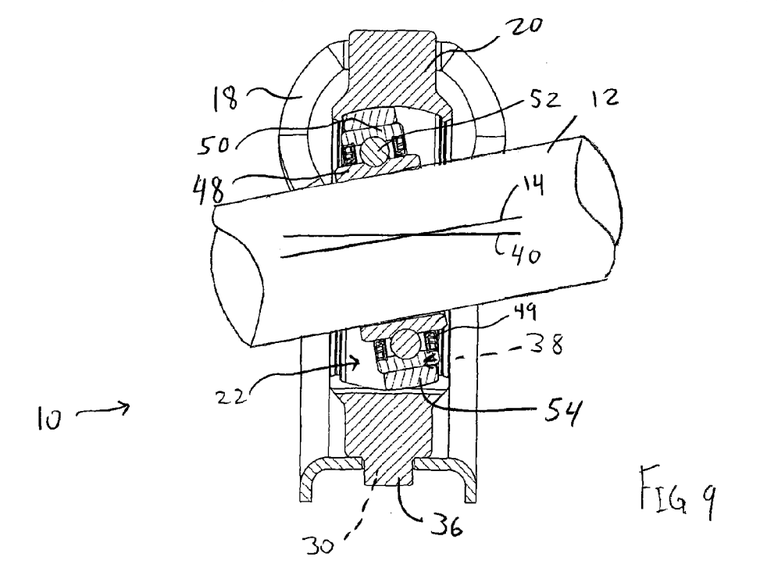
FIG. 9 is a side cross-section of the hanger bearing assembly of FIG. 2, with the bearing receiving a drive shaft therein and pivoted out of plane.

The bearing 22 can have an inner race 48 and an outer race 50 configured to rotate relative to each other. In some cases, the bearing 22 can be a sealed bearing, having a seal 49 positioned between the inner 48 and outer 50 races. The inner race 48 can define a cylindrical inner opening configured to grippingly receive the cylindrical drive shaft 12 therein. As shown in FIGS. 5, 8 and 9, in one case rolling components 52, such as balls or rollers, are positioned between the inner 48 and outer race 50, although the bearing 22 need not necessarily include such rolling components 52.

The bearing 22 can include a sleeve 54 coupled to the outer race 50 which has a spherical outer surface. The center of the spherical shape of the sleeve 54 can be coincident with the center of the spherical shape of the recess 38. In this manner, when the bearing 22 is positioned in the opening 38 of the vibration isolator 20, the spherical outer surface of the bearing 22 and the spherical inner surface of the opening 38 cooperate such that the bearing 22 is smoothly pivotable within the vibration isolator 20 in any direction. FIGS. 5, 8 and 9 illustrate an embodiment wherein the sleeve 54 is a separate component coupled to the outer race 50, and in this case the sleeve 54 can nevertheless be considered part of the outer race 50. Alternatively, in some cases, the outer race 50 can include an integral spherical outer surface and a separate sleeve component is not utilized.

In one embodiment, the sleeve 54/outer race 50 includes a pair of recesses 56 formed therein (FIG. 8), with the recesses 56 being positioned 180 degrees apart from each other. Each recess 56 is positioned to receive a protrusion 42 of the vibration isolator 20 therein to guide any pivoting/rotation of the bearing 22 about an axis defined by the protrusions 42/recesses 56. If desired, the position of the protrusions 42 and recesses 56 can be reversed such that one or both of the protrusions 42 are positioned on the bearing 22 and one or both of the recesses 56 are positioned on the vibration isolator 20. In addition, various other arrangements can be used to pivotally secure the bearing 22 to the vibration isolator 20. The protrusion/recess arrangement helps to prevent the sleeve 54 (if utilized) or outer race 50 from spinning relative to the rest of the bearing 22, helps to secure the bearing 22 in place and resist axial push-out, and limits pivoting of the bearing 22 to a predefined axis.

The spherical surface of opening 38 of the vibration isolator 20 can have a diameter that is at least slightly larger than the diameter of the spherical surface of the bearing 22 such that a gap is formed therebetween, if desired. In one case, the opening 38 of the vibration isolator 20 has a radius that is between about 1 percent and about 10 percent greater than the radius of the outermost surface of the bearing 22. For example, when the vibration isolator 20 is in its uncompressed position and the hanger bearing assembly 10 is not coupled to the chassis 16, as shown in FIG. 4, there can be a slight radial gap (not visible in FIG. 4) between the opening 38 of the vibration isolator 20 and the outer surface of the bearing 22. The slight radial gap can enable the bearing 22 to be relatively easily inserted into, or removed from, the opening 38 and coupled to the protrusions 42.

As shown in FIG. 8, when the mounting bracket 18/vibration isolator 20 is coupled to the chassis 16, the extension portion 46 of the vibration isolator 20 is compressed until the upper portion of the vibration isolator 20 is flush with the chassis 16/upper surface 25 of the mounting bracket 18. The compression of the extension portion 46 causes the entire vibration isolator 20 to be compressed between the mounting bracket 18 and the chassis 16. The extension portion 46 and configuration of the vibration isolator 20 can be carefully engineered and designed such that when the vibration isolator 20 is in its compressed position, the vibration isolator 20 provides the desired damping characteristics.

In addition, the compression of the vibration isolator 20 can reduce or close the radial gap between the outer surface of the bearing 22 and the opening 38 of the vibration isolator 20 so that the bearing 22 is trapped in the opening 38 in the desired manner. The gap allows the bearing 22 to pivot and self-align to the optimal position while the mounting bracket 18 is secured to the chassis 16. The vibration isolator 20, and more particularly the extension portion 46, can be shaped and sized such that when the vibration isolator 20 is compressed due to mounting, the bearing 22 is trapped therein and the vibration isolator 20 is compressed, but not compressed to a degree as to unduly press down on and engage the bearing 22 to prevent pivoting thereof relative to the vibration isolator 20. This enlarging and shrinking of the opening 38 provides for ease of assembly and mounting, as the bearing 22 may be able to be easily inserted into the opening 38 when the mounting bracket 18 is not coupled to the chassis 16, while the bearing 22 becomes trapped in place when the mounting bracket 18 is secured to the chassis 16.

Once the mounting bracket 18 is secured to the chassis 16 and the drive shaft 12 is received through the bearing 22, the bearing 22 is pivotable, due to the interaction of the spherical surfaces and/or the protrusions 42/recesses 56 to an angled or canted position as shown, for example, in FIG. 9. In this manner, the bearing 22 is pivotable to account for misalignment, movement or shifting of the drive shaft 12, while the mounting bracket 18 and vibration isolator 20 remain fixed in place and securely coupled to the vehicle chassis 16. The bearing assembly 10 also automatically self-aligns to accommodate the position of the drive shaft 12 should the drive shaft 12 move after mounting.

In addition, the vibration isolator 20 can be securely coupled to the mounting bracket 18 such that the vibration isolator 20 is not pivotable relative to the mounting bracket 18 and/or chassis 16. In particular, the interaction between the protrusions 34, 36 and openings 28, 30, the configuration of the ears 32, and the compression/frictional mounting of the vibration isolator 20 between the chassis 16 and the mounting bracket 18 can help ensure that the vibration isolator 20 remains aligned in a vertical position, and is not undesirably distorted. If the vibration isolator 20 were, for example, to be pivoted or misaligned relative to the mounting bracket 18, then the damping characteristics of the vibration isolator 20 would be adversely affected. In addition, mounting or enabling the vibration damper 20 to be mounted in a tilted or off-axis arrangement can subject the vibration isolator 20 to undesirable distortion from bending, and/or uneven compression which degrades performance by altering the spring rate and comprising durability. Thus, by securing the vibration isolator 20 in a position perpendicular to the vehicle chassis 16, it is ensured that the position of the vibration isolator 20 is known so that the vibration isolator 20 is uniformly compressed throughout its height, optimizing damping performance and durability. In one case then, for example, the bearing 22 defines a central axis 60 when the bearing 22 is aligned with the vibration isolator 20, as shown in FIG. 5, and the vibration isolator 20 can be fixedly coupled to the mounting bracket 18 such that the vibration isolator 20 remains generally aligned with a plane oriented perpendicular to the axis 60.

In this manner, the hanger bearing assembly 10 provides low friction, rotational support of a shaft 12 while compensating for misalignment between the shaft 12 and isolating the support 16 from vibration of the shaft 12.

Having described the invention in detail and by reference to the various embodiments, it should be understood that modifications and variations thereof are possible without departing from the scope of the claims of the present application.

What is claimed is:

1. A bearing assembly comprising:
  a mounting bracket configured to be coupled to a vehicle chassis, wherein said mounting bracket includes an upper surface configured to be attached to said vehicle chassis;
  a one-piece vibration isolator coupled to the mounting bracket, wherein said vibration isolator includes an extension portion extending beyond said upper surface and configured to be compressed when said hanger bearing assembly is coupled to said vehicle chassis; and
  a bearing received in said vibration isolator and configured to receive a drive shaft therein, wherein said bearing is pivotable relative to said vibration isolator.

2. The bearing assembly of claim 1 wherein said extension portion comprises at least about 1% and no more than about 5% of a height of said vibration isolator.

3. The bearing assembly of claim 1 wherein said vibration isolator is fixedly coupled to said mounting bracket such that said vibration isolator is not pivotable relative to said mounting bracket.

4. The bearing assembly of claim 1 wherein said bearing includes a central opening defining an axis when said bearing is aligned with said vibration isolator, and wherein said vibration isolator is fixedly coupled to said mounting bracket such that said vibration isolator remains generally aligned with a plane oriented perpendicular to said axis when said bearing is not aligned with said vibration isolator.

5. The bearing assembly of claim 1 wherein said mounting bracket includes at least one opening formed therein and wherein said vibration isolator includes at least one protrusion received through said at least one opening to couple said vibration isolator to said mounting bracket.

6. The bearing assembly of claim 1 wherein said vibration isolator is configured to absorb or dissipate vibration from said drive shaft.

7. The bearing assembly of claim 1 wherein the vibration isolator is made of an elastomeric material.

8. The bearing assembly of claim 1 wherein the vibration isolator has a hardness of less than 100 Shore A.

9. The bearing assembly of claim 1 wherein said vibration isolator includes a central opening and includes material having a thickness of at least about 15 mm on all sides of said opening.

10. The bearing assembly of claim 1 wherein said vibration isolator includes a plurality of slots formed at least partially therethrough to aid in absorption or dissipation of vibration from said drive shaft.

11. The bearing assembly of claim 1 wherein said bearing has a spherical outer surface, and wherein said vibration isolator includes a spherical opening closely receiving said spherical outer surface therein to movably receive said bearing therein.

12. The bearing assembly of claim 11 wherein said bearing includes a sleeve coupled to an outer race thereof defining said spherical outer surface.

13. The bearing assembly of claim 1 wherein said vibration isolator has an opening receiving said bearing therein, and wherein said opening is at least slightly larger than said bearing such that a radially-extending gap is positioned therebetween.

14. The bearing assembly of claim 1 wherein said vibration isolator has an opening having a radius that is between about 1% and about 10% greater than a radius of an outermost surface of said bearing.

15. The bearing assembly of claim 1 wherein said bearing includes an outer race and an inner race configured to rotate relative to said outer race, wherein said inner race is configured to receive said drive shaft therein.

16. The bearing assembly of claim 1 wherein said mounting bracket is generally "U" shaped in front view, and wherein said vibration isolator is generally "U" shaped in front view and is closely received in said mounting bracket, and includes a central opening receiving said bearing therein.

17. The bearing assembly of claim 1 further comprising the drive shaft rotatably received in said bearing.

18. The bearing assembly of claim 1 wherein the assembly is mounted to said vehicle chassis such that said vibration isolator is compressed between said chassis and said mounting bracket.

19. The bearing assembly of claim 1 wherein said bearing includes a set of opposed protrusions or recesses, and wherein said vibration isolator includes a set of protrusion or recesses, and wherein each protrusion is received in a corresponding recesses to define a pivot axis about which said bearing is pivotable.

* * * * *